United States Patent
Gharib et al.

(10) Patent No.: US 10,210,360 B2
(45) Date of Patent: Feb. 19, 2019

(54) ADJUSTABLE BENT HOUSING ACTUATION USING RADIO FREQUENCY IDENTIFICATION

(71) Applicant: Halliburton Energy Services, Inc., Houston, TX (US)

(72) Inventors: Hossam Mohamed Gharib, Edmonton (CA); Geoffrey Andrew Samuel, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/744,245

(22) PCT Filed: Sep. 2, 2015

(86) PCT No.: PCT/US2015/048054
§ 371 (c)(1),
(2) Date: Jan. 12, 2018

(87) PCT Pub. No.: WO2017/039647
PCT Pub. Date: Mar. 9, 2017

(65) Prior Publication Data
US 2018/0211075 A1    Jul. 26, 2018

(51) Int. Cl.
*G06K 19/00* (2006.01)
*G06K 7/10* (2006.01)
(Continued)

(52) U.S. Cl.
CPC .......... *G06K 7/10376* (2013.01); *E21B 7/067* (2013.01); *G06K 17/00* (2013.01); *G06K 19/07758* (2013.01)

(58) Field of Classification Search
USPC ............................ 235/487, 492; 340/10, 572
See application file for complete search history.

(56) References Cited

U.S. PATENT DOCUMENTS

| 4,184,545 A | 1/1980 | Claycomb et al. |
| 5,899,281 A | 5/1999 | Gynz-Rekowski et al. |
| (Continued) | | |

FOREIGN PATENT DOCUMENTS

| CA | 2841662 | 1/2013 |
| WO | 2016204756 | 12/2016 |

OTHER PUBLICATIONS

International Patent Application No. PCT/US2015/048054, "International Search Report and Written Opinion", dated Dec. 1, 2015, 10 pages.

*Primary Examiner* — Matthew Mikels
(74) *Attorney, Agent, or Firm* — Kilpatrick Townsend & Stockton LLP (57) ABSTRACT

An assembly usable with a bottom hole assembly in a wellbore can include a fixed housing member coupleable to a bent housing member at a housing coupling location. The bent housing member can rotate relative to the fixed housing member and can include an offset opening for receiving a drive shaft. The assembly can include an RFID tag positioned on a piston that is slideably positioned within the fixed housing member. An RFID reader can be positioned on the fixed housing member for detecting the RFID tag in response to the RFID tag being in a detectable range of the RFID reader. The RFID reader can also be for transmitting information about the RFID tag for controlling a motor to rotate and position the drive shaft at a selected angular position.

20 Claims, 3 Drawing Sheets

(51) Int. Cl.
*G06K 19/077* (2006.01)
*E21B 7/06* (2006.01)
*G06K 17/00* (2006.01)

(56) References Cited

U.S. PATENT DOCUMENTS

| | | |
|---|---|---|
| 5,941,321 A | 8/1999 | Hughes et al. |
| 6,047,784 A | 4/2000 | Dorel et al. |
| 6,554,083 B1 | 4/2003 | Kerstetter et al. |
| 6,742,604 B2 | 6/2004 | Brazil et al. |
| 7,360,609 B1 | 4/2008 | Falgout et al. |
| 7,373,995 B2 | 5/2008 | Hughes et al. |
| 7,555,391 B2 | 6/2009 | Gleitman et al. |
| 8,011,448 B2 | 9/2011 | Tulloch et al. |
| 8,276,689 B2 | 10/2012 | Giroux et al. |
| 8,376,065 B2 | 2/2013 | Teodorescu et al. |
| 8,453,527 B2 | 6/2013 | Soliman et al. |
| 8,511,404 B2 | 8/2013 | Rasheed |
| 8,540,035 B2 | 9/2013 | Vreeland et al. |
| 9,834,993 B2 | 12/2017 | Gharib et al. |
| 2004/0050590 A1 | 3/2004 | Pirovolou et al. |
| 2009/0223663 A1 | 9/2009 | Snider et al. |
| 2009/0266544 A1 | 10/2009 | Redlinger et al. |
| 2010/0032212 A1 | 2/2010 | Van Steenwyk et al. |
| 2010/0065143 A1 | 3/2010 | Johnson et al. |
| 2011/0155368 A1 | 6/2011 | El-Khazindar et al. |
| 2012/0080228 A1 | 4/2012 | Radford et al. |
| 2012/0126008 A1 | 5/2012 | Binmore et al. |
| 2012/0178653 A1 | 7/2012 | McClung et al. |
| 2013/0133949 A1* | 5/2013 | Xu .................... E21B 10/322 175/40 |
| 2013/0220701 A1 | 8/2013 | Crowley et al. |
| 2013/0319764 A1 | 12/2013 | Schaaf et al. |
| 2014/0111349 A1 | 4/2014 | Roberson et al. |

\* cited by examiner

ADJUSTABLE BENT HOUSING ACTUATION USING RADIO FREQUENCY IDENTIFICATION

TECHNICAL FIELD

The present disclosure relates to devices and methods for use in drilling for hydrocarbons such as oil and gas. More specifically, this disclosure relates to directional drilling.

BACKGROUND

A well system (e.g., oil or gas wells for extracting fluids from a subterranean formation) can include a drill string. The drill string can include a bottom hole assembly, a drive shaft, and a drill bit for drilling a wellbore. Wellbores can be vertical wellbores or deviated wellbores (e.g., wellbores that are not vertical in their entirety). Directional drilling can be used to drill deviated wellbores. A deviated wellbore can have enhanced production as compared to a vertical wellbore in the same location.

The direction of the drill bit, and thereby the angle of the wellbore, can be controlled through the bottom hole assembly. The bottom hole assembly can orient the drill bit through either an external bend to the bottom hole assembly housing or through an internal bend of the drive shaft of the drill bit. The external bend of the bottom hole assembly housing can be fixed in some instances, with no ability to adjust the external bend of the bottom hole assembly housing. Using a fixed external bend of the bottom hole assembly housing can reduce hole quality and can produce a curvature of the well that is larger or smaller than desired. When the external bend of the bottom hole assembly housing is adjustable, the external bend can be set at the surface of the wellbore. Adjustments to the external bend of the bottom hole assembly housing can require pulling the drill string out of the wellbore, adjusting the external bend, and then running the drill string back into the wellbore. Adjusting the external bend of the housing of the bottom hole assembly in this manner can lead to delays in the drilling operations

DETAILED DESCRIPTION

Certain aspects and examples of the disclosure are directed to a system for actuating a bend angle of a housing of a bottom hole assembly using radio frequency identification ("RFID"). An RFID housing actuation system can position a housing of the bottom hole assembly at a particular bend angle and thereby control the angular position of the drive shaft positioned within the housing. The angular position of the drive shaft can control the angle of the drill bit to control the angle of the wellbore. The RFID housing actuation system can allow for the bend angle of the housing of the bottom hole assembly to be adjusted from the surface of the wellbore, without tripping out the drill string.

The RFID housing actuation system can be used with a bottom hole assembly positioned in a wellbore. The bottom hole assembly can include a housing assembly with a fixed housing member that can be generally cylindrical in shape and can include a central opening for receiving a drive shaft. The central opening can have a center axis. The housing assembly can also include a bent housing member. The bent housing member can be coupled to the fixed housing member. The bent housing member may be rotated relative to the fixed housing member. The bent housing member can be generally cylindrical in shape and can include an offset opening for receiving a drive shaft. The offset opening have an axis that can be offset from the center axis of the fixed housing member. The position of the axis of the bent housing member relative to the center axis of the fixed housing member can define a bend angle of the bottom housing member. The rotational position of the bent housing member can determine the position of the axis of the offset opening relative to the center axis of the fixed housing member. The rotational position of the bent housing member can also determine an angular position of the drive shaft positioned within the offset opening. The angular position of the drive shaft can correspond to the bend angle of the bent housing member An RFID housing actuation system can also include one or more RFID tags positioned on a piston slideably coupled to the housing assembly of the bottom hole assembly (e.g., the fixed housing member). The RFID housing actuation system can also include an RFID reader coupled to the housing assembly. Each RFID tag can transmit a signature or signal corresponding to a particular bend angle of the bent housing member when in a detectable range of the RFID reader. The RFID reader can transmit the signature to a signal processing module. The signal processing module can determine the bend angle that corresponds to the signature. The RFID housing actuation assembly can also include a motor that controls the rotational position of the bent housing member and thereby the bend angle of the bent housing member. The rotational position of the bent housing member can determine the position of the drive shaft within the bent housing member. The signal processing module can transmit a command (or an instruction) to the motor to position the bent housing member, and thereby the drive shaft, at the bend angle associated with the RFID tag in the detectable range of the RFID reader.

Figure 1:
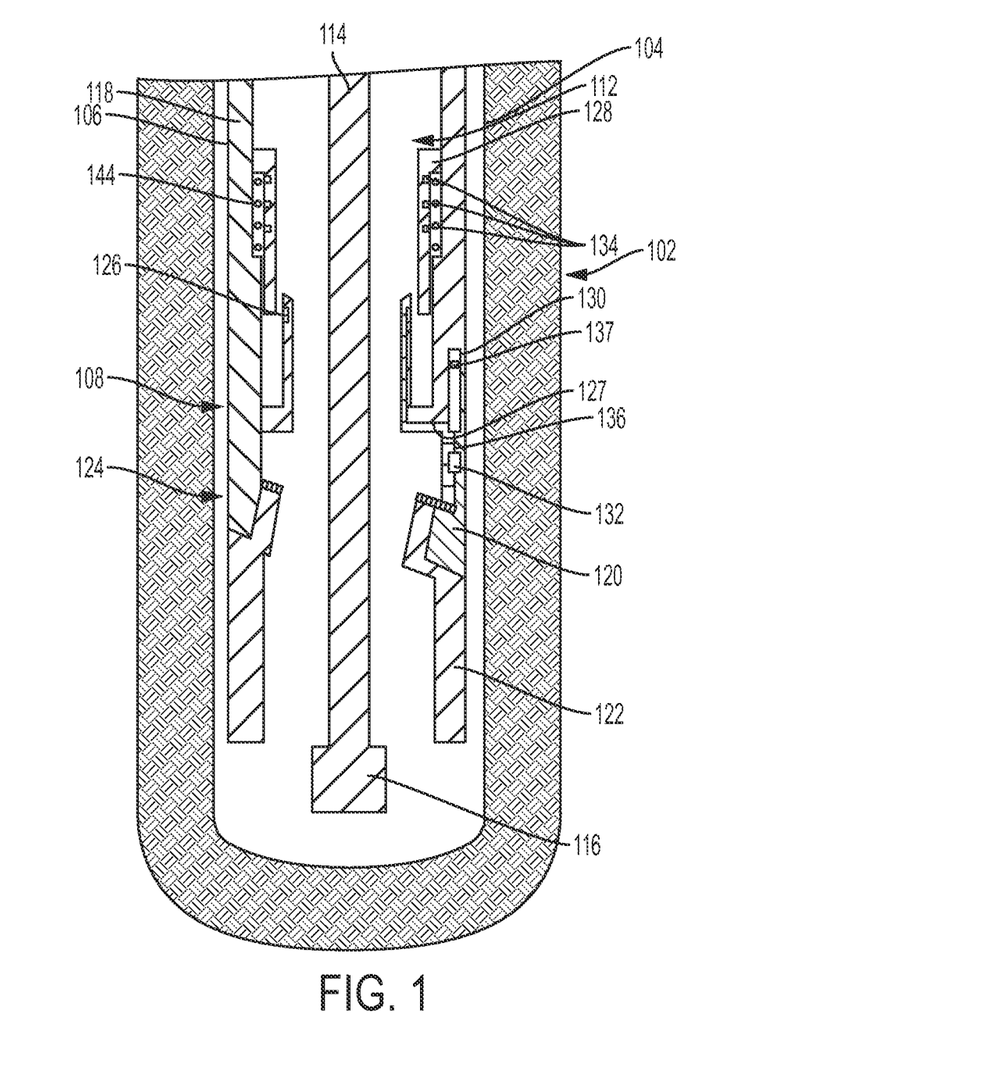
FIG. 1 is a schematic illustration of a well system that includes a radio frequency identification ("RFID") housing actuation system according to one aspect of the present disclosure.

FIG. 1 depicts a cross-sectional side view of one example of an RFID housing actuation system 102. The RFID housing actuation system 102 can be positioned on a drill string 106 in a wellbore 104 that extends through various earth strata through a hydrocarbon bearing subterranean formation. A drill string 106 for directional drilling can be positioned in the wellbore 104. The drill string 106 can include a bottom hole assembly 108. The bottom hole assembly 108 can include a drive shaft coupling section 112, a drive shaft 114, and a drill bit 116.

The bottom hole assembly 108 can include a housing assembly 118. The housing assembly 118 can include a first housing assembly member, for example fixed housing member 120. The housing assembly 118 can also include a second housing assembly member for example, bent housing member 122. The fixed housing member 120 can be coupled to the bent housing member 122 at a coupling location 124. The fixed housing member 120 can include a center opening that defines a center axis. The bent housing member 122 can include an offset opening having an axis (hereinafter the "offset axis") that can be positioned relative to the center axis of the fixed housing member 120. As the bent housing member 122 rotates, the offset axis can intersect the center axis of the fixed housing member 120 at various angles. The angular position of the offset axis of the bent housing member 122 relative to the center axis can determine a bend angle of the bent housing member 122. The drive shaft 114 can be positioned within the housing assembly 118, and specifically through the offset opening in the bent housing member 122. The bend angle of the bent housing member can determine an angular position of the drive shaft 114. The angular position of the drive shaft 114 can control the angle of the drill bit 116 and thereby the angle of the drilled hole.

The RFID housing actuation system 102 can include an RFID reader 126, a piston 128, a signal processing module 130, and a motor 132. One or more RFID tags 134 can be positioned on the piston 128. Some elements of the RFID housing actuation system 102 can be positioned at the drive shaft coupling section 112 of the bottom hole assembly 108. In some aspects, some of the elements of the RFID housing actuation system 102 can be positioned above drive shaft coupling section 112 of the bottom hole assembly 108 due to space limitation around the drilling motor drivetrain.

The piston 128 can be slideably coupled to an inside surface of the housing assembly 118 of the bottom hole assembly 108. In some aspects, the piston 128 can be coupled to a sleeve of the bottom hole assembly 108. The RFID reader 126 also can be positioned on the housing assembly 118. The RFID reader 126 can be in communication with a signal processing module 130 via a wired communication link 127. The wired communication link can be, for example, interfaces such as Ethernet, USB, IEEE 1394, or a fiber optic interface. In some aspects, a wireless communication link can be used in place of the wired communication link 127. The wireless communication link can be, for example, IEEE 802.11, Bluetooth, or radio interfaces for accessing cellular telephone networks (e.g., transceiver/antenna for accessing CDMA, GSM, UMTS, or other mobile communication networks). The signal processing module 130 can be positioned in a cavity of the housing assembly 118, on an inner or an outer surface of the housing assembly 118, or other suitable locations on the bottom hole assembly 108. In some aspects, the signal processing module 130 can be positioned away from the bottom hole assembly 108, for example but not limited to, at the surface of the wellbore 104 or on a tool positionable within the wellbore 104. The signal processing module 130 can be in communication with the motor 132 via a wired communication link 136. In some aspects, a wireless communication link could be used in place of the wired communication link 136.

A power source, for example a battery 137, can provide power to the signal processing module 130. In some aspects, the power source can be, for example but not limited to, a thermal generator, a fluid generator, a thermo-electric generator, a power supply located on a tool positioned within the bottom hole assembly, a power supply located on an add-on sub assembly, or a power supply located on a measurement while drilling system attached to the bottom housing assembly 108, or other suitable power source.

A restoring force can be exerted on the piston 128 by a spring 144 supporting the piston 128. An opposing force can act on the piston 128 to cause the piston 128 to slide within the housing assembly 118 against the restoring force of the spring 144. For example, the opposing force can be from the pressure of the drilling fluid, a gravitational force acting on a weight attached to an end of the piston 128, or an electro-magnetic force. The opposing force can cause the piston 128 to slide within the housing assembly 118, to compress the spring 144 and move one of the RFID tags 134 on the piston 128 within a detectable range of the RFID reader 126.

The RFID reader 126 can receive a signature or other electronically stored information from one of the RFID tags 134 when the RFID tag is in the detectable range. For example, the signature or information can be associated with a bend angle of the second housing assembly member 122. The RFID reader 126 can transmit the signature received from one of the RFID tags to the signal processing module 130 via the wired communication link 127. More than one RFID tag may be positioned on the piston 128 and each RFID tag may contain a different bend angle of the bent housing member 122. The bend angle of the bent housing member 122 can define an angular position of the drive shaft 114 positioned within the second housing assembly member 122. The RFID tags 134 can be positioned such that only one RFID tag may be in the detectable range of the RFID reader 126 at a given time. In other aspects, RFID tags 134 can be positioned such that a certain number of RFID tags are in the detectable range of the RFID reader 126 at a given time. The signal processing module 130 can determine the bend angle or other information corresponding to the signature.

The signal processing module 130 can transmit one or more commands to the motor 132 via the wired communication link 136 to rotate the bent housing member 122 to a position corresponding to the bend angle associated with the RFID tag. The rotational position of the bent housing member 122 can determine the position of the offset axis, which can thereby determine the bend angle of the bent housing member 122. The angular position of the drive shaft 114 can be determined by the bend angle of the bent housing member 122 as the drive shaft 114 passed through the offset opening in the bent housing member 122. The signature of each of the RFID tags 134 can correspond to a rotational position of the bent housing member 122, a bend angle of the bent housing member 122, or an angular position of the drive shaft 114.

Figure 2A:
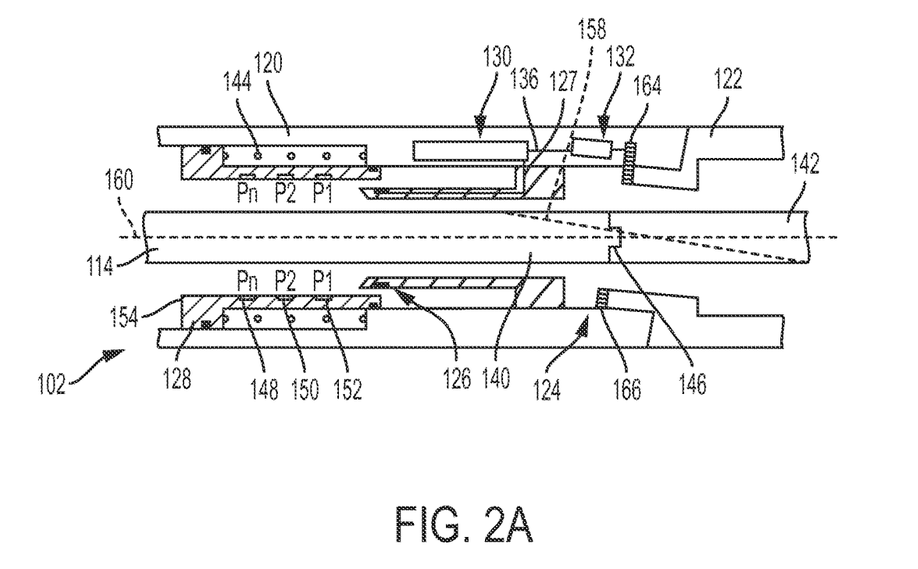
FIG. 2A is a cross-sectional side view of the RFID housing actuation system according to one aspect of the present disclosure.

FIG. 2A is a cross-sectional side view of the RFID housing actuation system 102 for controlling a bend angle of a housing assembly 118 of a bottom hole assembly 108 according to one aspect. The fixed housing member 120 can be a straight housing having a center axis 160. The bent housing member can include an offset opening defining an offset axis 158. The rotational position of the bent housing member 122 can determine an angular offset 156 between the offset axis 158 and the fixed axis 160. The angular offset 156 can correspond to the bend angle of the bent housing member 122 and thereby the angular position of the drive shaft 114 positioned within the offset opening of the bent housing member 122.

The drive shaft 114 can be positioned within the housing assembly 118 and can include a first drive shaft member 140 coupled to a second drive shaft member 142. The second drive shaft member 142 can be angled relative to the first drive shaft member 140 at a drive shaft coupling location 146. The drive shaft coupling location 146 can be proximate to a coupling location 124 of the fixed housing member 120 and the bent housing member 122. The bend angle of the bent housing member 122 can correspond to a drilling angle of the second drive shaft member 142 positioned within the bent housing member 122. In some aspects, the drive shaft 114 can be a single shaft that is flexible at a location that is proximate to the coupling location 124. The drive shaft 114 can flex relative to the position of the bent housing member 122, and more specifically relative to the position of the offset axis 158.

The RFID housing actuation system 102 can include multiple RFID tags positioned on the piston 128, for example RFID tags 148, 150, 152. Only three RFID tags are discussed herein to simplify illustration, but more or fewer RFID tags may be used in this or other embodiments described below in place of or in addition to RFID tags 148, 150, 152. Each RFID tag can include information, for example a bend angle, a rotational position, or a command to position the second housing assembly member 122 at a bend angle or a rotational setting. The number of RFID tags positioned on the piston 128 can determine the increments of the bend angle that the bent housing member 122 may be positioned at. The RFID tags 148, 150, 152 can be positioned in rings around the piston 128, in a spiral around the piston 128, and/or mounted to the piston 128 in other suitable positions. The RFID tags 148, 150, 152 can be positioned relative to one another so as to prevent signal interference between each RFID tag. The signal strength and interference of each RFID tag 148, 150, 152 can depend on the transmitted power, frequency, each RFID tag orientation, and the surrounding environment.

The RFID tags 148, 150, 152 can be passive tags that do not require their own internal power source. A passive RFID tag can use the radio energy transmitted by the RFID reader 126 to power the RFID tag and transmit information stored on the RFID tag to the RFID reader 126 when the RFID tag is in the detectable range. For example, the RFID reader 126 can continuously transmit radio waves or a signal that can be converted by an antenna of the passive tag into electricity that can power a microchip in the passive tag. In some aspects, the microchip can change the load on the antenna of the passive tag to transmit (or reflect back) to the RFID reader 126 an altered signal. The altered signal can correspond to the information stored on the passive tag. The characteristic of the altered signal can include for example, a specific magnetic field, a specific wave form, or a specific mode that is associated with the passive tag.

In some aspects, the RFID tags 148, 150, 152 can be active tags or a combination of active and passive tags. For example, an active tag on the piston 128 can include a signature associated with a first bend angle of the second housing assembly member 122 while a passive tag on the piston 128 can include a signature associated with a second bend angle of the second housing assembly member 122. An active RFID tag can include a battery and can periodically transmit its identification signal when in the presence of the RFID reader 126. Active tags can be more expensive than passive tags. In some aspects, passive tags can have a smaller detectable range associated with the RFID reader 126 than the active tags. In some aspects, the RFID reader 126 can be passive and can receive radio signals from passive RFID tags or active RFID tags as opposed to transmitting a signal to interrogate an RFID tag. The RFID reader 126 can be located at a single point on the housing assembly 118, can be located at multiple points on the housing assembly 118, or can be a partial or complete circular sleeve attached to the housing assembly 118.

An RFID tag can transmit its signature to the RFID reader 126 when the RFID tag is in the detectable range of the RFID reader 126. The RFID reader 126 can transmit the signature it received from the RFID tag to the signal processing module 130 via the wired communication link 127. The signal processing module 130 can determine the bend angle associated with the signature and can transmit one or more commands to the motor to rotate the bent housing member 122 via the wired communication link 136 to a position associated with the bend angle. The motor 132 can rotate the bent housing member 122 by powering a gear 164 that mates with an outer surface 166 of the bent housing member 122.

The piston 128 can be supported by the spring 144. The piston 128 can slide inside the housing assembly 118, for example the fixed housing member 120, against a restoring force of the spring 144 due to an opposing force acting on an end 154 of the piston 128. The spring 144 can be, for example, a compression spring. The spring 144 has a specific spring stiffness that is known and the force required to move the piston 128 a certain distance along a length of the housing assembly 118 can be represented by the relationship F=kx, where F is the Spring Force, k is the spring stiffness, and x is the distance the spring 144 is compressed.

The distance x the spring 144 is compressed can be determined and the position of the piston 128 relative to the housing assembly 118 can be determined. The position of the piston 128 relative to the housing assembly 118 can be determined based on the position of the spring 144. The position of each of the RFID tags 148, 150, 152 relative to the housing assembly 118 and the RFID reader 126 can be determined based on the location of the piston 128.

The position of the piston 128 and the RFID tags 148, 150, 152 can be controlled from the surface by adjusting the opposing force exerted on the end 154 of the piston 128. In some aspects, the opposing force can be from the internal drilling fluid (also known as "mud") introduced into the housing assembly 118 from a surface of the wellbore. The opposing force of the internal drilling fluid can be controlled by a pump located at the surface. In some aspects, the drilling fluid introduced downhole can include magnetized drilling fluid that can change a magnetic field, the magnetic field can act on the piston 128 and cause it slide within the housing assembly 118. The strength of the magnetic field can be altered by adjusting the magnetization of the drilling fluid prior to its injection downhole. In some aspects, the piston 128 can include a weight positioned at the end 154 of the piston 128. The force exerted on the spring 144 by the weight can be dependent on the inclination of the bottom hole assembly 108. For example, the full force of the weight of the piston 128 can be applied to the spring 144 when drilling downwards in a vertical drilling. In some aspects, the weight of the piston 128 is not acting on the spring 144 during horizontal drilling.

The opposing force applied to the end 154 of the piston 128 can be increased or decreased such that at least one of the RFID tags 148, 150, 152 is moved into a detectable range of the RFID reader 126. The RFID tags 148, 150, 152 can each transmit a signature to the RFID reader 126 when in the detectable range. The signature of each RFID tag 148, 150, 152 can be associated with a rotational position of the bent housing member 122 or a bend angle of the bent housing member 122. The second drive shaft member 142 can be positioned within the bent housing member 122 such that the position of the bent housing member 122 can control the angular position of the second drive shaft member 142.

Figure 2B:
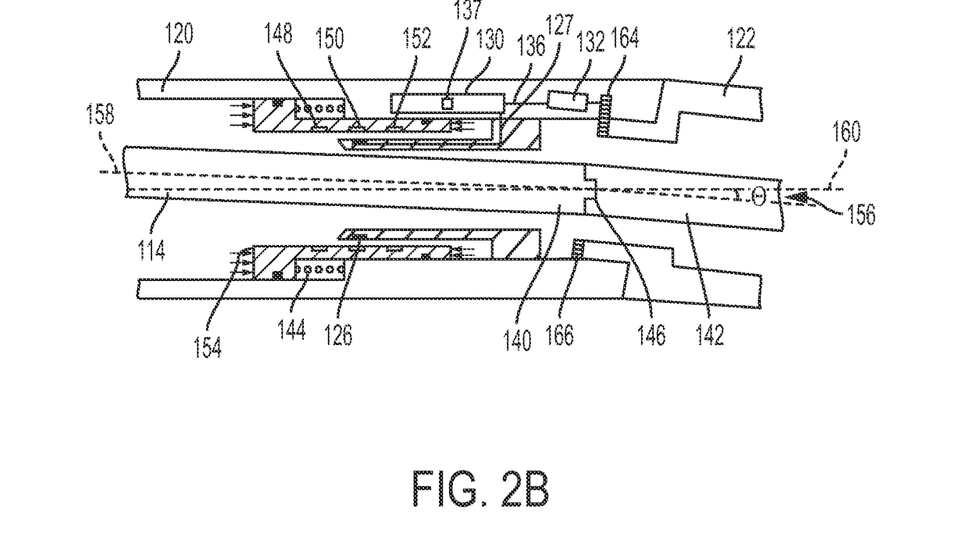
FIG. 2B is a cross-sectional side view of the RFID housing actuation system of FIG. 2A with an RFID tag in a detectable range according to one aspect of the present disclosure.

In FIG. 2A the RFID tags 148, 150, 152 are shown out of the detectable range of the RFID reader 126 positioned on a sleeve of the bent housing member 122 of the housing assembly 118. FIG. 2B is a cross-sectional side view the RFID housing actuation system 102 of FIG. 2A with the piston 128 positioned within the fixed housing member 120 and the RFID tag 150 in the detectable range of the RFID reader 126. The RFID tag 150 can transmit its signature to the RFID reader 126 when the RFID tag 150 is in the detectable range as shown in FIG. 2B. The RFID reader 126 can transmit the signature it received from the RFID tag 150 to the signal processing module 130 via the wired communication link 127. In some aspects, after receiving the signature from the RFID reader 126, the signal processing module 130 can transmit a notification via a wired or wireless communication link to a computing device at the surface of the wellbore. For example, the signal processing module 130 can transmit the notification by signal telemetry, acoustic telemetry, wired pipe, mud-pulse telemetry or electro-magnetic telemetry. The notification can include the information (e.g. the bend angle) associated with the signature of the RFID tag 150.

The signal processing module 130 can determine the bend angle associated with the signature received from the RFID reader 126. The signal processing module 130 can also transmit a command to the motor 132 via the wired communication link 136 to rotate the bent housing member 122 to a position at which the offset axis 158 is at the bend angle associated with the RFID tag 152. The rotational position of the bent housing member 122 can control the angular position of the second drive shaft member 142 that is positioned within the bent housing member 122. The angular position of the second drive shaft member 142 can correspond to the angle of the borehole drilled. The signal processing module 130 can be calibrated to determine the bend angle or the rotational position associated with the signature of each RFID tag 148, 150, 152. The signature of each RFID tag 148, 150, 152 can be a specific voltage change, current change, or other suitable signature identifiable by the signal processing module 130.

The motor 132 can control a gear 164 that is configured to mate with the outer surface 166 of the second housing assembly member 122. The gear 164 can rotate the bent housing member 122 and thereby adjust the angular offset 156 between the offset axis 158 and the fixed axis 160. In some aspects, when the bent housing member 122 is positioned in accordance with the signature of the RFID tag in the detectable range of the RFID reader 126, a locking mechanism can secure the bent housing member 122 in place.

The signal processing module 130 can include the battery 137 as a power source. The signal processing module 130 can also provide power to the RFID reader 126 via a pass-through wire connection between the RFID reader 126 and the signal processing module 130. In some aspects, the wired communication link 127 can also be the pass through wire connection for providing power to the RFID reader 126. When the RFID reader 126 receives less power the discoverable range of the RFID tags 148, 150, 152 can be decreased. The less amount of power the RFID reader 126 draws from the power source the longer the utility of the power source (e.g., length of the battery life). In some aspects, the power source could provide a larger amount of power, which can increase the detectable range of the RFID tags 148, 150, 152 and the accuracy of the RFID reader 126.

The motor 132 can also receive power from the power source of the signal processing module 130 via a wired connection passing between the motor 132 and the signal processing module 130 through the housing assembly 118. In some aspects, the wired connection can be the wired communication link 136. In some aspects, the RFID reader 126, piston 128, and signal processing module 130 can be positioned above the drive shaft coupling section 112 of the housing assembly 118 of the bottom hole assembly 108. The wired connection between the signal processing module 130 and the motor 132 can extend from the signal processing module 130 located above the drive shaft coupling section 112 of the bottom hole assembly 108, through the coupling section 112, terminating at the motor 132 positioned proximate to the coupling location of the fixed housing member 120 and bent housing member 122.

In some aspects, when the potential bend angles of the second housing assembly member 122 are small, the radial clearance of the housing assembly 118 can be minimized. The RFID reader 126, the piston 128, and the signal processing module 130 may then be positioned proximate to the coupling section 112. When the signal processing module 130 is positioned proximate to the coupling section 112 the wired communication link 136 between the signal processing module 130 and the motor 132 can extend a shorter distance through the housing assembly 118 as compared to when the signal processing module 130 is positioned above the drive shaft coupling section 112.

Figure 3:
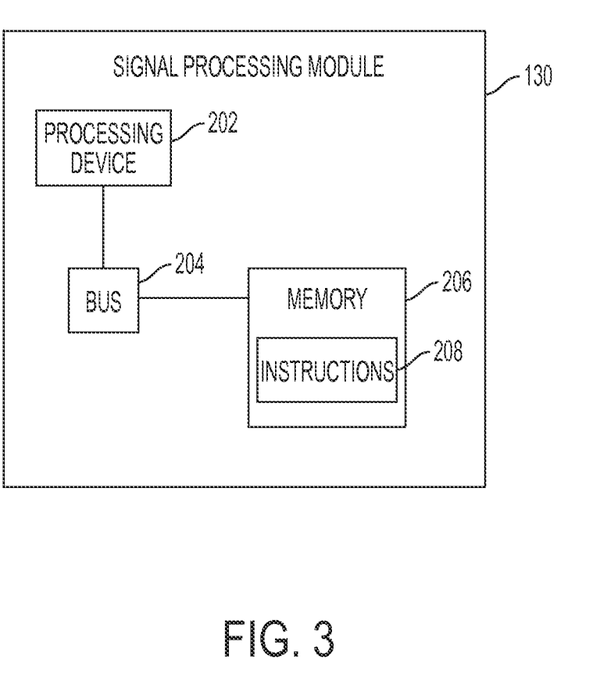
FIG. 3 is a block diagram depicting an example of a signal processing module according to one aspect of the present disclosure.

FIG. 3 is a block diagram depicting an example of a signal processing module 130 according to one aspect of the present disclosure. The signal processing module 130 includes a processing device 202, a memory device 206, and a bus 204.

The processing device 202 can execute one or more operations for determining a bend angle associated with a signal and transmitting instructions to a motor. The processing device 202 can execute instructions 208 stored in the memory device 206 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessor, etc.

The processing device 202 can be communicatively coupled to the memory device 206 via the bus 204. The non-volatile memory device 206 may include any type of memory device that retains stored information when powered off. Non-limiting examples of the memory device 206 include EEPROM, flash memory, or any other type of non-volatile memory. In some aspects, at least some of the memory device 206 can include a medium from which the processing device 202 can read the instructions 208. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

EXAMPLE #1

A system may comprise a fixed housing member coupleable to a bent housing member at a housing coupling location. The bent housing member may be rotatable relative to the fixed housing member and may have an offset opening for receiving a drive shaft. The system may include a radio frequency identification (RFID) tag on a piston that is slideably coupled to the fixed housing member. The system may also include an RFID reader coupled to the fixed housing member. The RFID reader may be for detecting the RFID tag in response to the RFID tag being in a detectable range of the RFID reader and for transmitting information about the RFID tag for controlling a motor to rotate the bent housing member and to position the drive shaft at an angular position.

EXAMPLE #2

The system of Example #1 may feature the offset opening including an axis that is positionable relative to a center axis of the fixed housing member by rotation of the bent housing member.

EXAMPLE #3

Any of the systems of Examples #1-2 may further comprise a signal processing module coupled to the RFID reader. The signal processing module may have a non-transitory, computer-readable medium on which is code. The code may be executable causing the signal processing module to receive the information about the RFID tag from the RFID reader, determine a selected angular position associated with the information about the RFID tag, and transmit a command to the motor to position the drive shaft at the selected angular position.

EXAMPLE #4

Any of the systems of Examples #1-3 may feature the drive shaft further comprising a first drive shaft member coupled to a second drive shaft member. The second drive shaft member may be bendable relative to the first drive shaft member at a location proximate to the housing coupling location.

EXAMPLE #5

Any of the systems of Examples #1-4 may feature the drive shaft being bendable proximate to the housing coupling location.

EXAMPLE #6

The system of Example #3 may further comprise a power source for providing power to the signal processing module. The power source may be a battery or a generator.

EXAMPLE #7

Any of the systems of Examples #1-6 may further comprise a spring supporting the piston. The piston may be slideable in response to a differential force, the differential force may be based on a restoring force of the spring and an opposing force.

EXAMPLE #8

The system of Example #3 may feature the RFID reader being communicatively and electronically coupled to the signal processing module via a first wired connection. The RFID reader may draws power from the signal processing module via the first wired connection.

EXAMPLE #9

The system of Example #3 may feature the motor being communicatively and electronically coupled to the signal processing module via a second wired connection. The motor may draw power from the signal processing module via the second wired connection.

EXAMPLE #10

An assembly may comprise a housing of a bottom hole assembly. The housing may include a bent housing member coupleable to a fixed housing member. The bent housing member may be rotatable relative to the fixed housing member. The bent housing member may have having an offset opening for receiving a drive shaft. The assembly may include a piston slideably coupled to the housing of the bottom hole assembly. The piston may include a radio frequency identification (RFID) tag to transmit information to an RFID reader, the information including a bend angle of the bent housing member. The assembly can also include a spring and a motor. The spring exert a restoring force on the piston. The motor may be coupled to the bent housing member to rotate the bent housing member in response to receiving a command from a signal processing module coupled to the RFID reader to determine the bend angle.

EXAMPLE #11

The assembly of Example #10 may feature the motor being coupled to a gear positioned to mate with an outside surface of the bent housing member.

EXAMPLE #12

Any of the assemblies of Examples #10-11 may further comprise
a power source for providing power to the signal processing module.

EXAMPLE #13

Any of the assemblies of Examples #10-12 may further comprise an additional RFID tag disposed on the piston for transmitting additional information to the RFID reader.

EXAMPLE #14

Any of the assemblies of Examples #10-13 may feature the piston being slideable in response to a differential force. The differential force may be based on the restoring force of the spring and an opposing force.

EXAMPLE #15

A method can include transmitting, by a radio frequency identification (RFID) tag, information about the RFID tag as well as receiving, by an RFID reader, the information about the RFID tag in response to the RFID tag being in a detectable range of the RFID reader. The method can include determining, by a signal processing module, a bend angle associated with the information. The method can further include generating, by the signal processing module, a command to rotate a bent housing member of a bottom hole assembly to position the bent housing member at the bend angle, the bent housing member including an offset opening for receiving a drive shaft.

EXAMPLE #16

The method of Example #15 may include transmitting, by a communication link, to a motor the command to rotate the bent housing member to position the bent housing member at the select bend angle.

EXAMPLE #17

Any of the methods of Examples #15-16 may further comprise transmitting, by a communication link, the information about the RFID tag from the RFID reader to the signal processing module.

EXAMPLE #18

Any of the methods of Examples #15-17 may further comprise rotating, by a gear positioned to mate with a surface of the bent housing member, the bent housing member to position the drive shaft at an angular position, the angular position corresponding to the bend angle of the bent housing member.

EXAMPLE #19

Any of the methods of Examples #15-18 may further comprise exerting a force on a piston coupled to a housing of a bottom hole assembly for positioning the RFID tag in a detectable range of the RFID reader, wherein the RFID tag is disposed on the piston.

EXAMPLE #20

Any of the methods of Examples #15-19 may further comprise moving a piston coupled to a housing of a bottom hole assembly by injecting drilling fluid from a surface, wherein the RFID tag is disposed from the piston.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a fixed housing member coupleable to a bent housing member at a housing coupling location, the bent housing member being rotatable relative to the fixed housing member and having an offset opening for receiving a drive shaft;
   a radio frequency identification (RFID) tag on a piston that is slideably coupled to the fixed housing member; and
   an RFID reader coupled to the fixed housing member for detecting the RFID tag in response to the RFID tag being in a detectable range of the RFID reader and for transmitting information about the RFID tag for controlling a motor to rotate the bent housing member and position the drive shaft at an angular position.

2. The system of claim 1, wherein the offset opening includes an axis that is positionable relative to a center axis of the fixed housing member by rotation of the bent housing member.

3. The system of claim 1, further comprising:
   a signal processing module coupled to the RFID reader, the signal processing module having a non-transitory, computer-readable medium on which is code that is executable causing the signal processing module to:
   receive the information about the RFID tag from the RFID reader;
   determine the angular position associated with the information about the RFID tag; and
   transmit a command to the motor to position the drive shaft at the angular position.

4. The system of claim 1, the drive shaft further comprising:
   a first drive shaft member coupled to a second drive shaft member, wherein the second drive shaft member is bendable relative to the first drive shaft member at a location proximate to the housing coupling location.

5. The system of claim 1, wherein the drive shaft is bendable proximate to the housing coupling location.

6. The system of claim 3, further comprising:
   a power source for providing power to the signal processing module, wherein the power source is a battery or a generator.

7. The system of claim 1, further comprising a spring supporting the piston, wherein the piston is slideable in response to a differential force, the differential force being based on a restoring force of the spring and an opposing force.

8. The system of claim 3, wherein the RFID reader is communicatively and electronically coupled to the signal processing module via a first wired connection, wherein the RFID reader draws power from the signal processing module via the first wired connection.

9. The system of claim 3, wherein the motor is communicatively and electronically coupled to the signal processing module via a second wired connection, wherein the motor draws power from the signal processing module via the second wired connection.

10. An assembly comprising:
    a housing of a bottom hole assembly that includes a bent housing member coupleable to a fixed housing member, the bent housing member rotatable relative to the fixed housing member and having an offset opening for receiving a drive shaft;
    a piston slideably coupled to the housing of the bottom hole assembly, the piston including a radio frequency identification (RFID) tag to transmit information to an RFID reader, the information including a bend angle of the bent housing member;
    a spring to exert a restoring force on the piston;
    a motor coupled to the bent housing member to rotate the bent housing member in response to receiving a command from a signal processing module coupled to the RFID reader to determine the bend angle.

11. The assembly of claim 10, wherein the motor is coupled to a gear positioned to mate with an outside surface of the bent housing member.

12. The assembly of claim 10, further comprising:
    a power source for providing power to the signal processing module.

13. The assembly of claim 10, further comprising:
    an additional RFID tag disposed on the piston for transmitting additional information to the RFID reader.

14. The assembly of claim 10, wherein the piston is slideable in response to a differential force, the differential force being based on the restoring force of the spring and an opposing force.

15. A method comprising:
    transmitting, by a radio frequency identification (RFID) tag, information about the RFID tag;

receiving, by an RFID reader, the information about the RFID tag in response to the RFID tag being in a detectable range of the RFID reader;
determining, by a signal processing module, a bend angle associated with the information; and
generating, by the signal processing module, a command to rotate a bent housing member of a bottom hole assembly to position the bent housing member at the bend angle, the bent housing member having an offset opening for receiving a drive shaft.

16. The method of claim 15, further comprising:
transmitting, by a communication link, to a motor the command to rotate the bent housing member to position the bent housing member at the bend angle.

17. The method of claim 15, further comprising:
transmitting, by a communication link, the information about the RFID tag from the RFID reader to the signal processing module.

18. The method of claim 15, further comprising:
rotating, by a gear positioned to mate with a surface of the bent housing member, the bent housing member to position the drive shaft at an angular position, the angular position corresponding to the bend angle of the bent housing member.

19. The method of claim 15, further comprising exerting a force on a piston coupled to a housing of a bottom hole assembly for positioning the RFID tag in a detectable range of the RFID reader, wherein the RFID tag is disposed on the piston.

20. The method of claim 15, further comprising moving a piston coupled to a housing of a bottom hole assembly by injecting drilling fluid from a surface, wherein the RFID tag is disposed on the piston.

* * * * *